United States Patent
Boivin et al.

(10) Patent No.: US 11,104,583 B2
(45) Date of Patent: Aug. 31, 2021

(54) METHOD FOR PREPARING PRECIPITATED SILICAS, NOVEL PRECIPITATED SILICAS, AND USES THEREOF, PARTICULARLY FOR POLYMER REINFORCEMENT

(71) Applicant: RHODIA OPERATIONS, Paris (FR)

(72) Inventors: Cédric Boivin, Chasselay (FR); Laurent Guy, Rillieux-la-Pape (FR); Eric Perin, Villefranche sur Saône (FR); Kilani Lamiri, L'Arbresle (FR)

(73) Assignee: RHODIA OPERATIONS, Aubervilliers (FR)

( * ) Notice: Subject to any disclaimer, the term of this patent is extended or adjusted under 35 U.S.C. 154(b) by 205 days.

(21) Appl. No.: 15/122,088

(22) PCT Filed: Feb. 26, 2015

(86) PCT No.: PCT/EP2015/053993
§ 371 (c)(1),
(2) Date: Aug. 26, 2016

(87) PCT Pub. No.: WO2015/128405
PCT Pub. Date: Sep. 3, 2015

(65) Prior Publication Data
US 2017/0015562 A1  Jan. 19, 2017

(30) Foreign Application Priority Data
Feb. 28, 2014 (FR) ...................................... 1400512

(51) Int. Cl.
| | |
|---|---|
| *C01B 33/193* | (2006.01) |
| *C08K 3/36* | (2006.01) |
| *C09C 1/30* | (2006.01) |
| *B60C 1/00* | (2006.01) |
| *C08L 9/06* | (2006.01) |
| *C01B 33/12* | (2006.01) |
| *C08J 3/20* | (2006.01) |
| *C08K 5/092* | (2006.01) |
| *C08K 5/1539* | (2006.01) |

(52) U.S. Cl.
CPC .............. *C01B 33/193* (2013.01); *B60C 1/00* (2013.01); *C01B 33/12* (2013.01); *C08J 3/203* (2013.01); *C08K 3/36* (2013.01); *C08K 5/092* (2013.01); *C08K 5/1539* (2013.01); *C08L 9/06* (2013.01); *C09C 1/30* (2013.01); *C09C 1/3072* (2013.01); *C01P 2006/12* (2013.01); *C01P 2006/14* (2013.01)

(58) Field of Classification Search
CPC .................................................... C01B 33/193
See application file for complete search history.

(56) References Cited

U.S. PATENT DOCUMENTS

| 5,403,570 | A  | * | 4/1995  | Chevallier .......... C01B 33/193 |
|---|---|---|---|---|
| | | | | 423/339 |
| 10,259,715 | B2 | * | 4/2019  | Boivin ................. B29D 30/00 |
| 2005/0032965 | A1 | * | 2/2005  | Valero ..................... A61K 8/25 |
| | | | | 524/493 |
| 2009/0214449 | A1 | | 8/2009  | Valero et al. |
| 2010/0083876 | A1 | | 4/2010  | Lahary et al. |
| 2011/0263784 | A1 | | 10/2011 | Valero et al. |
| 2015/0030519 | A1 | | 1/2015  | Allain |
| 2015/0266743 | A1 | | 9/2015  | Allain |
| 2017/0044020 | A1 | * | 2/2017  | Boivin ................. B60C 1/0016 |
| 2017/0058111 | A1 | * | 3/2017  | Boivin ....................... C08L 9/06 |

FOREIGN PATENT DOCUMENTS

| EP | 2325141 A1 | 5/2011 |
|---|---|---|
| FR | 2886285 A1 | 12/2006 |
| FR | 2902781 A1 | 12/2007 |
| FR | 2949455 A1 | 3/2011 |
| FR | 2985992 A1 | 7/2013 |
| FR | 2985993 A1 | 7/2013 |

OTHER PUBLICATIONS

George W. Sears, Jr., "Determination of specific surface area of colloidal silica by titration with sodium hydroxide", Analytical Chemistry, vol. 28, No. 12, Dec. 1956, pp. 1981-1983.

* cited by examiner

*Primary Examiner* — Vickey Nerangis
(74) *Attorney, Agent, or Firm* — Osha Bergman Watanabe & Burton LLP

(57) ABSTRACT

The invention relates to a process for preparing a precipitated silica, to precipitated silicas, and to uses thereof. The process of the invention generally includes reacting a silicate with an acidifying agent, so as to obtain a suspension of precipitated silica; filtering the precipitated silica to obtain a filter cake; subjecting the filter cake to a liquefaction operation to form a second filter cake; and drying the second filter cake. In the process of the invention, at least one polycarboxylic acid is added to the filter cake, during or after the liquefaction operation

16 Claims, 1 Drawing Sheet

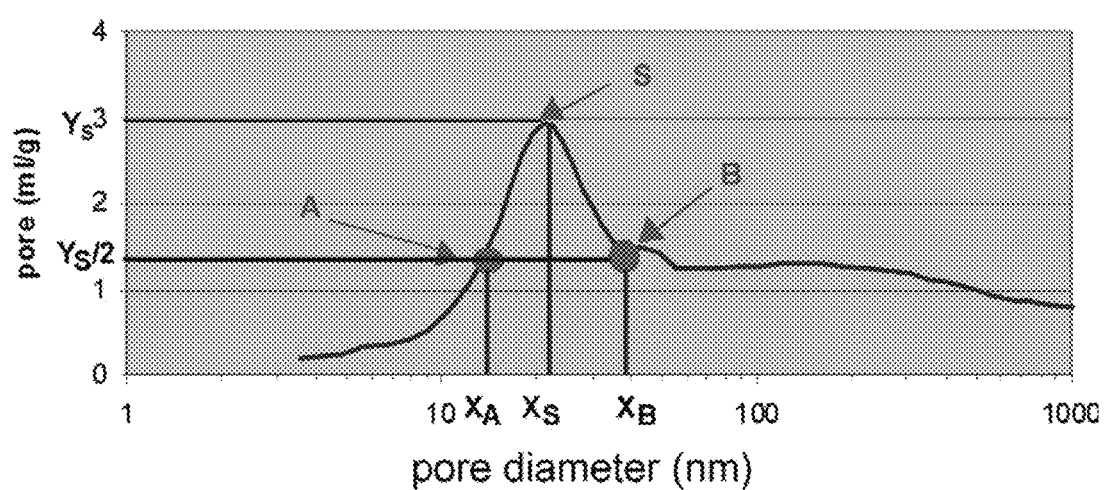

METHOD FOR PREPARING PRECIPITATED SILICAS, NOVEL PRECIPITATED SILICAS, AND USES THEREOF, PARTICULARLY FOR POLYMER REINFORCEMENT

CROSS-REFERENCE TO RELATED APPLICATIONS

The present application is a U.S. national phase entry under 35 U.S.C. § 371 of International Application No. PCT/EP2015/053993, filed on 26 Feb. 2015, which claims priority to French application No. 1400512, filed on 28 Feb. 2014. The entire contents of these applications are explicitly incorporated herein by this reference.

FIELD OF THE INVENTION

The present invention relates to a novel process for preparing precipitated silica, to novel precipitated silicas and to applications thereof, such as the reinforcement of polymers.

BACKROUND

It is known practice to employ reinforcing white fillers in polymers, in particular elastomers, for instance precipitated silica.

SUMMARY

The aim of the present invention is especially to provide an alternative filler for polymer compositions which advantageously affords them a reduction in their viscosity and an improvement in their dynamic properties, while retaining their mechanical properties. It thus advantageously enables an improvement in the hysteresis/reinforcement compromise.

The present invention first of all provides a novel process for preparing precipitated silica using, during or after the liquefaction operation, at least one polycarboxylic acid.

Generally, the preparation of precipitated silica is performed by a precipitation reaction of a silicate, such as an alkali metal silicate (for example sodium silicate), with an acidifying agent (for example sulfuric acid), then separation by filtration, with production of a filter cake of the precipitated silica obtained, followed by liquefying said filter cake and, finally, drying (generally by atomization). The silica may be precipitated in any manner in particular, addition of acidifying agent to a silicate feedstock or total or partial simultaneous addition of acidifying agent and of silicate to a feedstock of water or of silicate.

DETAILED DESCRIPTION OF THE INVENTION

One of the subjects of the invention is a novel process for preparing a precipitated silica, of the type comprising the precipitation reaction between a silicate and an acidifying agent, whereby a suspension of precipitated silica is obtained, followed by separation and drying of this suspension, characterized in that it comprises the following successive steps:
the precipitation reaction is performed in the following way:
(i) an initial feedstock comprising part of the total amount of alkali metal M silicate engaged in the reaction is formed, the concentration of silicate (expressed as $SiO_2$) in said initial feedstock being less than 20 g/l, preferably not more than 15 g/l,
(ii) acidifying agent is added to said initial feedstock, until at least 50% of the amount of $M_2O$ present in said initial feedstock is neutralized,
(iii) alkali metal M silicate and acidifying agent are simultaneously added to the reaction medium, such that the ratio of the amount of silicate added (expressed as $SiO_2$)/amount of silicate present in the initial feedstock (expressed as $SiO_2$) is greater than 4 and not more than 100, preferably between 12 and 100, in particular between 12 and 50,
(iv) the addition of the silicate is stopped while continuing the addition of the acidifying agent to the reaction medium, until a value of the pH of the reaction medium of between 2.5 and 5.3, preferably between 2.8 and 5.2, is obtained,
the silica suspension obtained is filtered,
the filter cake obtained after the filtration is subjected to a liquefaction operation,
the filter cake thus obtained, preferably having a solids content of not more than 25%, is dried,
said process being characterized in that at least one polycarboxylic acid (for example a mixture of polycarboxylic acids) is added to the filter cake, either during the liquefaction operation, or after the liquefaction operation and before the drying step.

The liquefaction operation is a fluidization or disintegration operation, in which the filter cake is rendered liquid, the precipitated silica being once again in suspension.

According to a first embodiment of the invention, the filter cake is subjected to a liquefaction operation, during or after which at least one polycarboxylic acid is introduced. The mixture then obtained (suspension of precipitated silica) is subsequently dried (generally by atomization).

In a first variant of this embodiment, this liquefaction operation is performed by subjecting the filter cake to a chemical action by addition of at least one polycarboxylic acid, preferably coupled with a mechanical action (for example, by passing through a continuously stirred tank or through a mill of colloidal type) which normally brings about a reduction in particle size of the suspended silica. The suspension (in particular aqueous suspension) obtained after liquefaction has a relatively low viscosity.

In a second variant of this first embodiment, this liquefaction operation is performed by subjecting the filter cake to a mechanical action (for example, by passing through a continuously stirred tank or through a mill of colloidal type) which normally brings about a reduction in particle size of the suspended silica.

In this second variant, at least one polycarboxylic acid is added after the liquefaction operation, i.e. to the disintegrated silica cake.

According to a second preferred embodiment of the invention, the liquefaction operation comprises the addition of at least one (generally one) aluminum compound.

Thus, according to this second embodiment of the invention, the filter cake is subjected to a liquefaction operation during which at least one aluminum compound and at least one polycarboxylic acid are introduced or after which at least one polycarboxylic acid is introduced. The mixture then obtained (suspension of precipitated silica) is subsequently dried (generally by atomization).

In two first variants of this second embodiment of the invention, this liquefaction operation is performed by subjecting the filter cake to a chemical action by addition of at least one aluminum compound, for example sodium aluminate, and of at least one polycarboxylic acid, preferably coupled with a mechanical action (for example, by passing through a continuously stirred tank or through a mill of colloidal type) which normally brings about a reduction in particle size of the suspended silica. The suspension (in particular aqueous suspension) obtained after liquefaction has a relatively low viscosity.

In the first variant of this embodiment, during the liquefaction operation, at least one aluminum compound and at least one polycarboxylic acid are simultaneously added (coaddition) to the filter cake.

In the second variant of this embodiment, during the liquefaction operation, at least one aluminum compound is added to the filter cake prior to the addition of at least one polycarboxylic acid.

In a third variant of this second embodiment, this liquefaction operation is performed by subjecting the filter cake to a chemical action by addition of at least one aluminum compound, for example sodium aluminate, preferably coupled with a mechanical action (for example, by passing through a continuously stirred tank or through a mill of colloidal type) which normally brings about a reduction in particle size of the suspended silica.

In this third variant, at least one polycarboxylic acid is added after the liquefaction operation, i.e. to the disintegrated silica cake.

According to the invention, the liquefaction operation may comprise the addition of water.

According to the invention, the filter cake that is to be subjected to the liquefaction operation may be composed of a mixture of several filter cakes, each of said cakes being obtained by filtration of a portion of the suspension of precipitated silica obtained above (this suspension being, prior to the filtration, split into several parts).

According to the invention, the term "polycarboxylic acid" means polycarboxylic acids comprising at least two carboxylic acid functional groups. The term "carboxylic acid functional group" is taken herein in its usual meaning and refers to the —COOH functional group.

The polycarboxylic acid used according to the invention may contain two, three, four or more than four carboxylic acid functional groups.

According to the invention, the polycarboxylic acid is preferably chosen from dicarboxylic and tricarboxylic acids.

According to the invention, the polycarboxylic acid used may be a linear or branched, saturated or unsaturated, aliphatic polycarboxylic acid containing from 2 to 20 carbon atoms or an aromatic polycarboxylic acid. The polycarboxylic acid may optionally comprise hydroxyl groups and/or halogen atoms. The aliphatic polycarboxylic acid may optionally comprise heteroatoms on the main chain, for example N or S. Generally, the polycarboxylic acid used according to the invention is chosen from the group consisting of linear or branched, saturated or unsaturated, aliphatic polycarboxylic acids containing from 2 to 16 carbon atoms and aromatic polycarboxylic acids.

Among the aliphatic polycarboxylic acids, mention may be made of linear, saturated or unsaturated polycarboxylic acids containing from 2 to 14 carbon atoms and preferably from 2 to 12 carbon atoms. The polycarboxylic acid used may contain 2, 3, 4, 5, 6, 7, 8, 9, 10, 11 or 12 carbon atoms. Advantageously, the polycarboxylic acid used may contain 4, 5, 6, 7, 8, 9 or 10 carbon atoms, and preferably 4, 5, 6, 7 or 8 carbon atoms. For example, the polycarboxylic acid used may contain 4, 5 or 6 carbon atoms.

In particular, nonlimiting examples that may be mentioned of linear aliphatic polycarboxylic acids used in the invention include acids chosen from the group consisting of oxalic acid, malonic acid, tricarballylic acid, succinic acid, glutaric acid, adipic acid, pimelic acid, suberic acid, azelaic acid and sebacic acid.

Among the branched polycarboxylic acids, mention may be made of methylsuccinic acid, ethylsuccinic acid, oxalosuccinic acid, methyladipic acid, methylglutaric acid and dimethylglutaric acid. The term "methylglutaric acid" means both 2-methylglutaric acid and 3-methylglutaric acid and also a mixture of these two isomers in all proportions. The term "2-methylglutaric acid" is used to indicate both the (S) and (R) forms of the compound and the racemic mixture.

Among the unsaturated polycarboxylic acids, mention may be made of maleic acid, fumaric acid, itaconic acid, muconic acid, aconitic acid, traumatic acid and glutaconic acid.

Among the polycarboxylic acids comprising hydroxyl groups, mention may be made of malic acid, citric acid, isocitric acid and tartaric acid.

Among the aromatic polycarboxylic acids, mention may be made of phthalic acids, namely phthalic acid, orthophthalic acid, isophthalic acid, trimesic acid and trimellitic acid.

Preferably, the polycarboxylic acid used in the process according to the invention is chosen from the group consisting of oxalic acid, malonic acid, tricarballylic acid, succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid, isocitric acid and tartaric acid.

Preferably, the dicarboxylic and tricarboxylic acids are chosen from adipic acid, succinic acid, ethylsuccinic acid, glutaric acid, methylglutaric acid, oxalic acid and citric acid.

The polycarboxylic acid may also be chosen from the group consisting of oxalic acid, malonic acid, tricarballylic acid, succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid, isocitric acid and tartaric acid. Preferably, the polycarboxylic acid may be chosen from the group consisting of oxalic acid, malonic acid, succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid, isocitric acid and tartaric acid. Very preferably, the polycarboxylic acid may be chosen from the group consisting of succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid and tartaric acid.

In a first embodiment of the invention, a single polycarboxylic acid is added to the filter cake.

Preferably, the polycarboxylic acid is then succinic acid.

Preferably, when the polycarboxylic acid is succinic acid, it is added to the filter cake after the liquefaction operation.

In a second preferred embodiment of the invention, a mixture of polycarboxylic acids is added to the filter cake, said mixture comprising at least two polycarboxylic acids as defined above. The mixture may comprise two, three, four or more than four polycarboxylic acids.

Preferably, the polycarboxylic acids of the mixture are then chosen from adipic acid, succinic acid, ethylsuccinic acid, glutaric acid, methylglutaric acid, oxalic acid and citric acid.

According to the invention, the mixture of polycarboxylic acids is preferably a mixture of dicarboxylic and/or tricarboxylic acids, especially a mixture of at least two, preferably of at least three, dicarboxylic and/or tricarboxylic acids, in particular a mixture of three dicarboxylic and/or tricarboxylic acids.

Preferably, the mixture of polycarboxylic acids is a mixture of dicarboxylic acids, especially a mixture of at least three dicarboxylic acids, in particular a mixture of three dicarboxylic acids. In general, the mixture consists of three dicarboxylic acids, although impurities may be present in an amount generally not exceeding 2.00% by weight of the total mixture.

According to a preferred variant of the invention, the mixture of polycarboxylic acids used in the invention comprises the following acids: adipic acid, glutaric acid and succinic acid. For example, the mixture of polycarboxylic acids comprises from 15.00% to 35.00% by weight of adipic acid, from 40.00% to 60.00% by weight of glutaric acid and from 15.00% to 25.00% by weight of succinic acid.

The mixture of polycarboxylic acids according to this first preferred variant of the invention may result from a process for manufacturing adipic acid.

According to another preferred variant of the invention, the mixture of polycarboxylic acids used in the invention comprises the following acids: methylglutaric acid, ethylsuccinic acid and adipic acid. The three acids may be present in the mixture in all proportions. For example, the mixture of polycarboxylic acids comprises from 60.00% to 96.00% by weight of methylglutaric acid, from 3.90% to 20.00% by weight of ethylsuccinic acid and from 0.05% to 20.00% by weight of adipic acid.

The mixture of polycarboxylic acids according to this second preferred variant of the invention may result from a process for manufacturing adipic acid.

Advantageously, the mixture of polycarboxylic acids according to this second preferred variant of the invention may be obtained by acid hydrolysis, preferably by basic hydrolysis, of a mixture of methylglutaronitrile, ethylsuccinonitrile and adiponitrile resulting from the process for manufacturing adiponitrile by hydrocyanation of butadiene, adiponitrile being an important intermediate in the synthesis of hexamethylenediamine.

Some or all of the polycarboxylic acid(s), in particular of the dicarboxylic and/or tricarboxylic acids, used according to the invention may be in the form of a carboxylic acid derivative, namely in the anhydride, ester, alkali metal (for example sodium or potassium) salt (carboxylate), alkaline-earth metal (for example calcium) salt (carboxylate) or ammonium salt (carboxylate) form. The term "carboxylate" will be used hereinbelow to denote the derivatives of carboxylic acid functional groups as defined previously.

For example, the mixture of polycarboxylic acids may be a mixture comprising:
methylglutaric acid (in particular from 60.00% to 96.00% by weight, for example from 90.00% to 95.50% by weight),
ethylsuccinic anhydride (in particular from 3.90% to 20.00% by weight, for example from 3.90% to 9.70% by weight),
adipic acid (in particular from 0.05% to 20.00% by weight, for example from 0.10% to 0.30% by weight).

The mixture of polycarboxylic acids may also be a mixture comprising:
methylglutaric acid (in particular from 10.00% to 50.00% by weight, for example from 25.00% to 40.00% by weight),
methylglutaric anhydride (in particular from 40.00% to 80.00% by weight, for example from 55.00% to 70.00% by weight),
ethylsuccinic anhydride (in particular from 3.90% to 20.00% by weight, for example from 3.90% to 9.70%),
adipic acid (in particular from 0.05% to 20.00% by weight, for example from 0.10% to 0.30% by weight).

The mixtures used according to the invention may optionally comprise impurities.

The polycarboxylic acids used in the invention may optionally be preneutralized (in particular by pretreating them with a base, for example of sodium hydroxide or potassium hydroxide type) before they are added to the filter cake. This makes it possible in particular to modify the pH of the silica obtained.

The polycarboxylic acids may be used in the form of an aqueous solution.

Preferably, the aluminum compound used in the second embodiment of the invention is chosen from alkali metal aluminates. In particular, the aluminum compound is sodium aluminate.

According to the invention, the amount of aluminum compound (in particular sodium aluminate) used is generally such that the ratio of aluminum compound to amount of silica, expressed as $SiO_2$, contained in the filter cake is between 0.20% and 0.50% by weight, preferably between 0.25% and 0.45% by weight.

The amount of polycarboxylic acid(s) used is in general such that the ratio of polycarboxylic acid(s) to amount of silica, expressed as $SiO_2$, contained in the filter cake (at the time of addition of at least one polycarboxylic acid) is between 0.50% and 2.00% by weight, preferably between 0.55% and 1.75% by weight, in particular between 0.60% and 1.20% by weight, for example between 0.65% and 1.25% by weight.

In the invention, the filter cake may optionally be washed.

The use, during or after the liquefaction operation, of a mixture of polycarboxylic acids and the succession of particular steps gives the products obtained their particular characteristics and properties.

The choice of the acidifying agent and of the alkali metal silicate M is made in a manner well known per se.

Use is generally made, as acidifying agent, of a strong mineral acid, such as sulfuric acid, nitric acid or hydrochloric acid, or of an organic acid, such as acetic acid, formic acid or carbonic acid.

The acidifying agent may be dilute or concentrated; its normality may be between 0.4 and 36 N, for example between 0.6 and 1.5 N.

In particular, in the case where the acidifying agent is sulfuric acid, its concentration may be between 40 and 180 g/l, for example between 60 and 130 g/l.

Use may be made, as silicate, of any common form of silicates, such as metasilicates, disilicates and advantageously an alkali metal M silicate in which M is sodium or potassium.

The silicate may have a concentration (expressed as $SiO_2$) of between 2 and 330 g/l, for example between 3 and 300 g/l, in particular between 4 and 260 g/l.

Preferably, use is made of sulfuric acid as acidifying agent and of sodium silicate as silicate.

In the case where sodium silicate is used, the latter generally has an $SiO_2/Na_2O$ weight ratio of between 2.0 and 4.0, in particular between 2.4 and 3.9, for example between 3.1 and 3.8.

An aqueous feedstock which comprises silicate is first formed (step (i)).

According to one characteristic of the preparation process of the invention, the concentration of silicate in the initial feedstock, expressed as $SiO_2$ equivalent, is less than 20 g/l. This concentration is preferably not more than 15 g/l, in particular not more than 11 g/l, for example not more than 8 g/l.

The initial feedstock formed in step (i) may optionally comprise an electrolyte. However, preferably, no electrolyte is added during the preparation process, in particular in step (i).

The term "electrolyte" is understood here in its generally accepted sense, i.e. it means any ionic or molecular substance which, when in solution, decomposes or dissociates to form ions or charged particles. Mention may be made, as electrolytes, of a salt from the group of the salts of alkali metals and alkaline-earth metals, in particular the salt of the metal of the starting silicate and of the acidifying agent, for example sodium chloride in the case of the reaction of a sodium silicate with hydrochloric acid or, preferably, sodium sulfate in the case of the reaction of a sodium silicate with sulfuric acid.

The second step (step (ii)) consists in adding the acidifying agent to the composition feedstock described above.

Thus, in this second step, acidifying agent is added to said initial feedstock, until at least 50%, in particular 50% to 99%, of the amount of $M_2O$ present in said initial feedstock is neutralized.

Once the desired value of the amount of neutralized $M_2O$ is reached, a simultaneous addition (step (iii)) of acidifying agent and of an amount of alkali metal M silicate is then performed such that the degree of consolidation, i.e. the ratio of the amount of silicate added (expressed as $SiO_2$)/amount of silicate present in the initial feedstock (expressed as $SiO_2$), is greater than 4 and not more than 100.

According to one variant of the process of the invention, this simultaneous addition of acidifying agent and of an amount of alkali metal M silicate is performed such that the degree of consolidation is preferably between 12 and 100, in particular between 12 and 50, especially between 13 and 40.

According to another variant of the process of the invention, this simultaneous addition of acidifying agent and of an amount of alkali metal M silicate is performed such that the degree of consolidation is, rather, greater than 4 and less than 12, in particular between 5 and 11.5, especially between 7.5 and 11. This variant is generally performed when the concentration of silicate in the initial feedstock is at least 8 g/l, in particular between 10 and 15 g/l, for example between 11 and 15 g/l.

Preferably, throughout step (iii), the amount of acidifying agent added is such that 80% to 99%, for example 85% to 97%, of the amount of $M_2O$ added is neutralized.

In step (iii), it is possible to perform the simultaneous addition of acidifying agent and silicate at a first pH stage of the reaction medium, $pH_1$, followed by a second pH stage of the reaction medium, $pH_2$, such that $7<pH_2<pH_1<9$.

Next, in a step (iv), the addition of the silicate is stopped while continuing the addition of acidifying agent to the reaction medium so as to obtain a pH value in the reaction medium of between 2.5 and 5.3 (for example between 3.0 and 5.3), preferably between 2.8 and 5.2 (for example between 4.0 and 5.2), in particular between 3.5 and 5.1 (or even between 3.5 and 5.0).

It is optionally possible to perform, just after this step (iv), maturation of the reaction medium, especially at the pH obtained after step (iv), and in general with stirring; this maturation may last, for example, from 2 to 45 minutes, in particular from 5 to 20 minutes, and preferentially does not comprise any addition of acidifying agent or addition of silicate.

The reaction chamber in which the entire reaction of the silicate with the acidifying agent is performed is usually equipped with adequate stirring equipment and heating equipment.

The temperature of the reaction medium is generally between 68 and 98° C.

The entire reaction of the silicate with the acidifying agent is generally performed between 70 and 95° C., in particular between 70 and 90° C.

According to one variant of the invention, the entire reaction of the silicate with the acidifying agent is performed at a constant temperature, preferably of between 70 and 90° C.

According to another variant of the invention, the temperature at the end of the reaction is higher than the temperature at the start of the reaction: thus, the temperature at the start of the reaction (for example during steps (i) to (ii)) is preferably maintained at between 68 and 80° C. and the temperature is then increased, preferably up to a value of between 80 and 98° C., at which value it is maintained (for example during steps (iii) and (iv)), up to the end of the reaction.

At the end of the steps that have just been described, a silica slurry is obtained, which is subsequently separated (liquid/solid separation).

The separation used in the preparation process according to the invention usually comprises filtration followed by washing, if necessary, performed by means of any suitable method, for example by means of a belt filter, a vacuum filter or, preferably, a filter press.

The filter cake is then subjected to a liquefaction operation. In accordance with the above account, at least one polycarboxylic acid is added during or after the liquefaction operation.

The disintegrated filter cake is then dried by atomization.

Preferably, in this preparation process, the suspension of precipitated silica obtained after 0 the liquefaction operation should have, immediately before it is dried, a solids content of not more than 25% by weight, in particular not more than 24% by weight, especially not more than 23% by weight, for example not more than 22% by weight.

The drying may be performed according to any means known per se. Preferably, the drying is performed by atomization. To this end, use may be made of any type of suitable atomizer, in particular a rotary, nozzle, liquid pressure or two-fluid atomizer. In general, when the filtration is performed using a filter press, a nozzle atomizer is used, and when the filtration is performed using a vacuum filter, a rotary atomizer is used.

According to a preferred embodiment of the invention, the drying is performed using a nozzle atomizer. The precipitated silica that may then be obtained is advantageously in the form of substantially spherical beads. After this drying operation, it is optionally possible to perform a step of milling on the recovered product; the precipitated silica that may then be obtained is generally in the form of a powder.

Similarly, according to another embodiment of the invention, the drying is performed using a rotary atomizer. The precipitated silica that may then be obtained may be in the form of a powder.

Finally, the dried (in particular by a rotary atomizer) or milled product as indicated previously may optionally be subjected to an agglomeration step, which consists, for example, of direct compression, wet granulation (i.e. with use of a binder, such as water, silica suspension, etc.), extrusion or, preferably, dry compacting. When the latter technique is used, it may prove to be opportune, before performing the compacting, to deaerate (operation also referred to as predensifying or degassing) the pulverulent products so as to remove the air included therein and to provide more uniform compacting.

The precipitated silica that may then be obtained via this agglomeration step is generally in the form of granules.

The invention also relates to the precipitated silicas obtained or that may be obtained via the process according to the invention.

In general, these precipitated silicas have at their surface molecules of the polycarboxylic acid(s) used and/or of the carboxylate(s) corresponding to the polycarboxylic acid(s) used.

A subject of the present invention is also a precipitated silica with particular characteristics, which may be used especially as an alternative filler for polymer compositions, advantageously affording them a reduction in their viscosity and an improvement in their dynamic properties, while retaining their mechanical properties.

In the account hereinbelow, the BET specific surface area is determined according to the Brunauer-Emmett-Teller method described in the *Journal of the American Chemical Society*, Vol. 60, page 309, February 1938, and corresponding to standard NF ISO 5794-1, Appendix D (June 2010). The CTAB specific surface area is the external surface, which may be determined according to standard NF ISO 5794-1, Appendix G (June 2010).

The content of polycarboxylic acid+corresponding carboxylate denoted (C), expressed as total carbon, may be measured using a carbon/sulfur analyzer, such as the Horiba EMIA 320 V2 machine. The principle of the carbon/sulfur analyzer is based on the combustion of a solid sample in a stream of oxygen in an induction furnace (adjusted to approximately 170 mA) and in the presence of combustion accelerators (approximately 2 grams of tungsten (in particular Lecocel 763-266) and approximately 1 gram of iron). The analysis lasts approximately 1 minute.

The carbon present in the sample to be analyzed (mass of approximately 0.2 gram) combines with the oxygen to form $CO_2$, CO. These decomposition gases are subsequently analyzed by an infrared detector.

The moisture from the sample and the water produced during these oxidation reactions is removed by passing through a cartridge comprising a dehydrating agent (magnesium perchlorate) so as not to interfere with the infrared measurement.

The result is expressed as a mass percentage of element carbon.

Depending on the source of starting materials used for the silicate, the precipitated silicas according to the invention may contain additional elements, for instance metals. Among said additional elements, mention may be made of aluminum. The corresponding aluminum content is then generally less than 1400 ppm, especially less than 1200 ppm, preferably less than 700 ppm, in particular less than 600 ppm and more preferably less than 500 ppm.

The content of aluminum, denoted (Al), may be determined by wavelength dispersive X-ray fluorescence, for example with a Panalytical 2400 spectrometer or, preferably, with a Panalytical MagixPro PW2540 spectrometer. The principle of the method of measurement by X-ray fluorescence is as follows:
grinding of the silica is necessary when it is in the form of substantially spherical beads (microbeads) or of granules, until a homogeneous powder is obtained. The grinding may be performed with an agate mortar (grinding 15 grams of silica approximately for a time of 2 minutes) or any type of grinder not comprising aluminum, the powder is analyzed as is in a vessel having a diameter of 40 mm with a polypropylene film of 6 µm, under a helium atmosphere, at an irradiation diameter of 37 mm, and the amount of silica analyzed is 9 $cm^3$. The measurement of the aluminum content, which requires at most 5 minutes, is obtained from the Kα line (2θ angle=145°, PE002 crystal, 550 µm collimator, gas flow detector, rhodium tube, 32 kV and 125 mA). The intensity of this line is proportional to the aluminum content. It is possible to employ a precalibration performed using another measurement method, such as ICP-AES (Inductively Coupled Plasma—Atomic Emission Spectroscopy).

The aluminum content may also be measured by any other suitable method, for example by ICP-AES after dissolving in water in the presence of hydrofluoric acid.

The presence of polycarboxylic acid(s) in acid form and/or in carboxylate form may be established by surface infrared or diamond-ATR (Attenuated Total Reflection) Infrared.

The surface infrared analysis (by transmission) is performed on a Broker Equinox 55 spectrometer on a pellet of pure product. The pellet is obtained after grinding the silica as is in an agate mortar and pelleting at 2 $T/cm^2$ for 10 seconds. The diameter of the pellet is 17 mm. The weight of the pellet is between 10 and 20 mg. The pellet thus obtained is placed in the high vacuum chamber ($10^{-7}$ mbar) of the spectrometer for one hour at room temperature before the analysis by transmission. Acquisition takes place under high vacuum (acquisition conditions: from 400 $cm^{-1}$ to 6000 $cm^{-1}$; number of scans: 100; resolution: 2 $cm^{-1}$).

The diamond-ATR analysis, performed on a Bruker Tensor 27 spectrometer, consists in depositing, on the diamond, a spatula-tip of silica preground in an agate mortar and in then exerting a pressure. The infrared spectrum is recorded on the spectrometer in 20 scans, from 650 $cm^{-1}$ to 4000 $cm^{-1}$. The resolution is 4 $cm^{-1}$.

The centrifugal sedimentation XDC particle size analysis method, via which are measured the size distribution widths of silica objects, is described below:

Materials Required

BI-XDC centrifugal sedimentation particle size analyzer (Brookhaven-Instrument X DISC Centrifuge) sold by the company Brookhaven Instrument Corporation)

high-sided 50 ml beaker 50 ml measuring cylinder 1500 watt Branson ultrasonic probe, without endpiece, 19 mm in diameter deionized water crystallizing dish filled with ice magnetic stirrer Measurement Conditions Windows version 3.54 of the software (supplied by the particle size analyzer constructor)

fixed mode spin speed: 5000 rpm analysis time: 120 minutes density (silica): 2.1 volume of suspension to be collected: 15 ml

Sample Preparation

Place 3.2 g of silica and 40 ml of deionized water in a high-sided beaker.

Place the beaker containing the suspension in the crystallizing dish filled with ice.

Immerse the ultrasonic probe in the beaker.

Deagglomerate the suspension for 16 minutes using the 1500 watt Branson probe (used in general at 60% of the maximum power).

When the deagglomeration is complete, place the beaker on a magnetic stirrer.

Cool the dispersion obtained to room temperature (21° C.).

Preparation of the Particle Size Analyzer

Switch on the machine and leave it to warm up for at least 30 minutes.

Rinse the disk twice with deionized water.

Enter the measurement conditions mentioned above into the software.

Measurement of the Blank:

Introduce 10 ml of deionized water into the disk, place under rocker agitation and take a measurement of the signal.

Remove the deionized water.

Measurement of the Samples:

Introduce 15 ml of the sample to be analyzed into the disk, place under rocker agitation and take a measurement of the signal.

Take the measurements.

When the measurements have been taken:

Stop the rotation of the disk.

Rinse the disk several times with deionized water.

Switch off the machine.

Results

In the machine register, note the values of the diameters passing at 16%, 50% (or median, size for which 50% by mass of the aggregates are smaller than this size) and 84% (mass %).

The object size distribution width Ld, measured by XDC particle size analysis, after ultrasound deagglomeration (in water), corresponds to the ratio (d84−d16)/d50 in which dn is the size for which n % of particles (by mass) are smaller than this size (the distribution width Ld is thus calculated on the cumulative particle size curve, taken in its entirety).

The size distribution width L'd of objects smaller than 500 nm, measured by XDC particle size analysis, after ultrasound deagglomeration (in water), corresponds to the ratio (d84−d16)/d50 in which dn is the size for which n % of particles (by mass), relative to the particles smaller than 500 nm, are smaller than this size (the distribution width L'd is thus calculated on the cumulative particle size curve, truncated above 500 nm).

The pore volumes and pore diameters are measured by mercury (Hg) porosimetry using a Micromeritics Autopore 9520 porosimeter and are calculated by the Washburn relationship with a contact angle theta equal to 130° and a gamma surface tension equal to 484 dynes/cm (standard DIN 66133). The preparation of each sample is performed as follows: each sample is predried in an oven at 200° C. for 2 hours.

The pore distribution width ldp is obtained from the pore distribution curve, as indicated in FIG. 1, pore volume (ml/g) as a function of the pore diameter (nm): the coordinates of point S corresponding to the main population, i.e. the values of the diameter (nm) $X_S$ and of the pore volume (ml/g) $Y_S$, are read; a straight line of equation $Y=Y_S/2$ is plotted; this straight line crosses the pore distribution curve at two points A and B having the x-axis values (nm) $X_A$ and $X_B$, respectively, on either side of $X_S$; the pore distribution width ldp is equal to the ratio $(X_A-X_B)/X_S$.

The ratio denoted (R) is determined by the following relationship:

$$(R) = N \times \frac{[(100 \times (C)/C_T) \times M_{Al}]}{((Al) \times M_{Ac})},$$

in which:

N is the mean number of carboxylic functions per polycarboxylic acid (for example, if all the polycarboxylic acids are dicarboxylic acids (or, respectively, tricarboxylic acids), N is equal to 2 (or, respectively, to 3)), (C) and (Al) are the contents as defined above, $C_T$ is the carbon content of the polycarboxylic acid(s), $M_{Al}$ is the molecular mass of aluminum, $M_{Ac}$ is the molecular mass of the polycarboxylic acid(s)

The dispersive component of the surface energy $\gamma_s^d$ is determined by inverse gas chromatography. Grinding of the silica is generally necessary when it is in the form of granules, followed by screening, for example at 106 µm-250 µm.

The technique used to calculate the dispersive component of the surface energy $\gamma_s^d$ is Inverse Gas Chromatography at Infinite Dilution (IGC-ID) at 110° C. using a series of alkanes (normal alkanes) ranging from 6 to 10 carbon atoms, a technique based on gas chromatography but where the roles of the mobile phase and of the stationary phase (packing) are reversed. In this instance, the stationary phase in the column is replaced with the (solid) material to be analyzed, in this instance the precipitated silica. With regard to the mobile phase, it consists of the carrier gas (helium) and of the "probe" molecules chosen as a function of their interaction capability. The measurements are successively performed with each probe molecule. For each measurement, each probe molecule is injected into the column, in a very small amount (infinite dilution), as a mixture with methane. The methane is used to determine the t0, the dead time of the column.

Subtracting this dead time t0 from the retention time of the injected probe gives its net retention time ($t_N$).

These operating conditions, specific to infinite dilution, mean that these retention times reflect solely the interactivity of the sample with regard to these molecules. Physically, $t_N$ corresponds to the mean time which the probe molecule has spent in contact with the stationary phase (the solid analyzed). For each probe molecule injected, three net retention times $t_N$ are measured. The mean value and the corresponding standard deviation are used to determine the specific retention volumes ($V_g^0$) on the basis of the following relationship (formula [1]).

$$V_g^0 = \frac{D_c t_N}{M_S} \cdot \frac{273.15}{T} \qquad \text{formula [1]}$$

The latter corresponds to the volume of carrier gas (brought back to 0° C.) necessary to elute the probe molecule per 1 gram of stationary phase (solid examined). This standard quantity makes it possible to compare the results, irrespective of the flow rate of carrier gas and the mass of stationary phase used. Formula [1] involves: $M_s$ the mass of solid in the column, $D_c$ the flow rate of carrier gas and T the measurement temperature.

The specific retention volume is subsequently used to access $\Delta G_a$, the variation in free enthalpy of adsorption of the probe, according to the formula [2], with R the universal ideal gas constant (R=8.314 J·K$^{-1}$·mol$^{-1}$), on the solid present in the column.

$$\Delta G_a = RT \cdot \text{Ln}(V_g^0) \quad \text{formula [2]}$$

This quantity $\Delta G_a$ is the starting point for the determination of the dispersive component of the surface energy ($\gamma_s^d$). The latter is obtained by plotting the straight line representing the variation in free enthalpy of adsorption ($\Delta Ga$) as a function of the carbon number $n_c$ of the n-alkane probes, as shown in the table below.

| n-alkane probes | $n_c$ |
|---|---|
| n-hexane | 6 |
| n-heptane | 7 |
| n-octane | 8 |
| n-nonane | 9 |
| n-decane | 10 |

It is then possible to determine the dispersive component of the surface energy $\gamma_s^d$ from the slope $\Delta G_a(CH2)$ of the straight line of the normal alkanes, corresponding to the free enthalpy of adsorption of the methylene group, obtained for a measurement temperature of 110° C.

The dispersive component of the surface energy $\gamma_s^d$ is then related to the free enthalpy of adsorption $\Delta G_a^{CH2}$ of the methylene group (Doris-Gray method, *J. Colloid Interface Sci.*, 77 (180), 353-362) by the following relationship:

$$\gamma_s^d = \frac{(\Delta G_a^{CH_2})^2}{4N_A^2 \cdot a_{CH_2}^2 \cdot \gamma_{CH_2}}$$

in which $N_A$ is Avogadro's number (6.02×10$^{23}$ mol$^{-1}$), $\alpha_{CH_2}$ is the area occupied by an adsorbed methylene group (0.06 nm$^2$) and $\gamma_{CH_2}$ is the surface energy of a solid consisting solely of methylene group and determined on polyethylene (35.6 mJ/m$^2$ at 20° C.).

The coordinancy of the aluminum is determined by solid aluminum NMR.

The technique used to measure the water uptake consists generally in placing the predried silica sample under given relative humidity conditions for a predetermined time; the silica then hydrates, which causes the mass of the sample to change from an initial value m (in the dried state) to a final value m+dm. The term "water uptake" of a silica specifically denotes, in particular throughout the rest of the account, the dm/m ratio (i.e. the mass of water incorporated in the sample relative to the mass of the sample in the dry state), expressed as a percentage, calculated for a silica sample subjected to the following conditions during the measurement method:
preliminary drying: 8 hours, at 150° C.;
hydration: 24 hours, at 20° C., and under a relative humidity of 70%.
The experimental protocol used consists in successively:
precisely weighing approximately 2 grams of the silica to be tested;
drying, for 8 hours, the silica thus weighed out in an oven adjusted to a temperature of 105° C.;
determining the mass m of the silica obtained after this drying operation;
placing, for 24 hours, at 20° C., the dried silica in a closed container, such as a desiccator, comprising a water/glycerol mixture, so that the relative humidity of the closed medium is 70%;
determining the mass (m+dm) of the silica obtained subsequent to this treatment at 70% relative humidity for 24 hours, the measurement of this mass being performed immediately after having removed the silica from the desiccator, so as to avoid any variation in the mass of the silica under the influence of the change in hygrometry between the medium at 70% relative humidity and the atmosphere of the laboratory.

The ability of the silicas to disperse and to deagglomerate may be quantified by means of the specific deagglomeration test below.

The cohesion of the agglomerates is assessed by a particle size measurement (by laser diffraction) performed on a suspension of silica deagglomerated beforehand by ultrasonication; the ability of the silica to deagglomerate (cleavage of objects from 0.1 to a few tens of microns) is thus measured. Ultrasound deagglomeration is performed using a Vibracell Bioblock sonicator (600 W), used at 80% of the maximum power, equipped with a probe 19 mm in diameter. The particle size measurement is performed by laser diffraction on a Malvern particle size analyzer (Mastersizer 2000) employing the Fraunhofer theory.

2 grams (±0.1 gram) of silica are introduced into a 50 ml beaker (height: 7.5 cm and diameter. 4.5 cm) and the weight is made up to 50 grams by addition of 48 grams (±0.1 gram) of deionized water. A 4% aqueous silica suspension is thus obtained.

Ultrasound deagglomeration is then performed for 7 minutes.

The particle size measurement is then performed by introducing all of the homogenized suspension into the particle size analyzer chamber.

The median diameter $\varnothing_{50M}$ (or median Malvern diameter), after ultrasound deagglomeration, is such that 50% by volume of the particles have a size of less than $\varnothing_{50M}$ and 50% have a size of greater than $\varnothing_{50M}$. The median diameter value $\varnothing_{50M}$ which is obtained is proportionately smaller the higher the ability of the silica to deagglomerate.

It is also possible to determine in the same manner the Malvern deagglomeration factor $F_{DM}$ by means of a particle size measurement (by laser diffraction) on a suspension of silica deagglomerated beforehand by ultrasonication; the ability of the silica to deagglomerate (cleavage of objects from 0.1 to a few tens of microns) is thus measured. Ultrasound deagglomeration is performed using a Vibracell Bioblock sonicator (600 W), used at 80% of the maximum power, equipped with a probe 19 mm in diameter. The particle size measurement is performed by laser diffraction on a Malvern particle size analyzer (Mastersizer 2000) employing the Fraunhofer theory.

1 gram (±0.1 gram) of silica is introduced into a 50 ml beaker (height: 7.5 cm and diameter. 4.5 cm) and the weight is made up to 50 grams by addition of 49 grams (±0.1 gram) of deionized water. A 2% aqueous silica suspension is thus obtained.

Ultrasound deagglomeration is then performed for 7 minutes.

The particle size measurement is then performed by introducing all of the homogenized suspension into the particle size analyzer chamber.

This deagglomeration factor is determined by the ratio (10× value of the blue laser obscuration/value of the red laser obscuration), this optical density corresponding to the real value detected by the particle size analyzer during the introduction of the silica.

This ratio (Malvern deagglomeration factor $F_{DM}$) is indicative of the content of particles with a size of less than 0.1 µm which are not detected by the particle size analyzer. This ratio increases in proportion as the ability of the silica to deagglomerate increases.

The Sears number is determined according to the method described by G. W. Sears in the article in *Analytical Chemistry*, vol. 28, No. 12, December 1956 entitled *Determination of specific surface area of colloidal silica by titration with sodium hydroxide*.

The Sears number is the volume of 0.1 M sodium hydroxide required to raise the pH from 4 to 9 of a silica suspension at 10 g/l in sodium chloride medium at 200 g/l.

To do this, a sodium chloride solution at 200 g/l acidified to pH 3 with 1M hydrochloric acid solution is prepared, from 400 g of sodium chloride. The weighings are performed using a Mettler precision balance. 150 ml of this sodium chloride solution are placed carefully in a 250 ml beaker into which has been introduced beforehand a mass M (in grams) of the sample to be analyzed corresponding to 1.5 g of dry silica. Ultrasound is applied to the dispersion obtained for 8 minutes (1500 W Branson ultrasonication probe, amplitude of 60%, diameter of 13 mm), the beaker being in a crystallizing basin filled with ice. The solution obtained is then homogenized by magnetic stirring, using a magnetic bar 25 mm×5 mm in size. The pH of the suspension is checked to ensure that it is less than 4, adjusting it if necessary with 1M hydrochloric acid solution. 0.1 M sodium hydroxide solution is then added at a rate of 2 ml/min, using a Metrohm titrating pH-meter (titroprocessor 672, dosimat 655), precalibrated using pH 7 and pH 4 buffer solutions. (The titrating pH-meter was programmed as follows: 1) Call up the program "Get pH", 2) Introduce the following parameters: pause (waiting time before the start of titration): 3 s, reagent flow rate: 2 ml/min, anticipation (adaptation of the speed of titration to the slope of the pH curve): 30, stop pH: 9.40, critical EP (sensitivity of detection of the equivalence point): 3, report (titration report printing parameter): 2,3,5 (i.e. creation of a detailed report, list of measuring points, titration curve)). The exact volumes $V_1$ and $V_2$ of sodium hydroxide solution added to obtain, respectively, a pH of 4 and a pH of 9 are determined by interpolation. The Sears number for 1.5 g of dry silica is equal to $((V_2-V_1)\times150)/(SC\times M)$, with:

$V_1$: volume of 0.1 M sodium hydroxide solution at $pH_1=4$
$V_2$: volume of 0.1 M sodium hydroxide solution at $pH_2=9$
M: mass of the sample (g)
SC: % solids content.

The pH is measured according to the following method deriving from standard ISO 787/9 (pH of a 5% suspension in water):

Equipment
calibrated pH meter (reading accurate to $\frac{1}{100}^{th}$)
combined glass electrode
200 ml beaker
100 ml measuring cylinder
balance accurate to within 0.01 g.

Procedure:
5 grams of silica are weighed out to within 0.01 gram in the 200 ml beaker. 95 ml of water, measured using the graduated measuring cylinder, are then added to the silica powder. The suspension thus obtained is vigorously stirred (magnetic stirring) for 10 minutes. The pH measurement is then performed.

According to a first variant of the invention, the precipitated silica according to the invention is characterized in that it has:

a BET specific surface area of between 100 and 240 m²/g,
a CTAB specific surface area of between 100 and 240 m²/g,
a content (C) of polycarboxylic acid+corresponding carboxylate, expressed as total carbon, of at least 0.15% by weight, in particular of at least 0.20% by weight,
an object size distribution width Ld ((d84−d16)/d50), measured by XDC particle size analysis after ultrasound deagglomeration, of at least 0.70, and
a pore distribution width ldp of less than 0.65.

This silica may have an object size distribution width Ld ((d84−d16)/d50), measured by XDC particle size analysis after ultrasound deagglomeration, of at least 0.75, in particular of at least 0.80, especially of at least 0.90, for example of at least 1.00.

This silica may have a pore distribution width ldp of less than 0.60, in particular less than 0.55, especially less than 0.49, for example less than 0.45.

In a first embodiment of this first variant, the precipitated silica preferentially has an aluminum content of less than 1400 ppm, especially less than 1200 ppm, in particular less than 700 ppm, especially less than 600 ppm, for example not more than 500 ppm, or even equal to 0 ppm.

In a second embodiment of this first variant, the precipitated silica has an aluminum (Al) content of at least 0.20% by weight, especially of at least 0.25% by weight.

This precipitated silica may especially have an aluminum (Al) content of at least 0.30% by weight, in particular of at least 0.33% by weight. It generally has an aluminum (Al) content of less than 1% by weight, in particular not more than 0.50% by weight, for example not more than 0.45% by weight.

Preferably, this precipitated silica has a ratio (R) between 0.4 and 3.5, in particular between 0.4 and 2.5. This ratio (R) may also be between 0.5 and 3.5, especially between 0.5 and 2.5, in particular between 0.5 and 2, for example between 0.7 and 2, or even between 0.7 and 1.8, or between 0.7 and 1.6.

According to a second variant of the invention, the precipitated silica according to the invention is characterized in that it has:

a BET specific surface area of between 100 and 240 m²/g,
a CTAB specific surface area of between 100 and 240 m²/g,
a content (C) of polycarboxylic acid+corresponding carboxylate, expressed as total carbon, of at least 0.15% by weight, in particular of at least 0.20% by weight, and
a pore distribution width ldp of less than 0.49.

In a first embodiment of this second variant, the precipitated silica preferentially has an aluminum content of less than 1400 ppm, especially less than 1200 ppm, in particular less than 700 ppm, especially less than 600 ppm, for example not more than 500 ppm, or even equal to 0 ppm.

In a second embodiment of this second variant, the precipitated silica has an aluminum (Al) content of at least 0.20% by weight, especially of at least 0.25% by weight.

This precipitated silica may especially have an aluminum (Al) content of at least 0.30% by weight, in particular of at least 0.33% by weight. It generally has an aluminum (Al) content of less than 1% by weight, in particular of not more than 0.50% by weight, for example not more than 0.45% by weight.

Preferably, this precipitated silica has a ratio (R) between 0.4 and 3.5, in particular between 0.4 and 2.5. This ratio (R) may also be between 0.5 and 3.5, especially between 0.5 and 2.5, in particular between 0.5 and 2, for example between 0.7 and 2, or even between 0.7 and 1.8, or between 0.7 and 1.6.

According to a third variant of the invention, the precipitated silica according to the invention is characterized in that it has:
- a BET specific surface area of between 100 and 240 m$^2$/g,
- a CTAB specific surface area of between 100 and 240 m$^2$/g,
- a content (C) of polycarboxylic acid+corresponding carboxylate, expressed as total carbon, of at least 0.15% by weight, in particular of at least 0.20% by weight, and
- a Sears number per 1 gram of dry silica of less than 12.5, especially less than 11.0, in particular less than 8, for example less than 7.5, or even less than 7.

In a first embodiment of this third variant, the precipitated silica preferentially has an aluminum content of less than 1400 ppm, especially less than 1200 ppm, in particular less than 700 ppm, especially less than 600 ppm, for example not more than 500 ppm, or even equal to 0 ppm.

In a second embodiment of this third variant, the precipitated silica has an aluminum (Al) content of at least 0.20% by weight, especially of at least 0.25% by weight.

This precipitated silica may especially have an aluminum (Al) content of at least 0.30% by weight, in particular of at least 0.33% by weight. It generally has an aluminum (Al) content of less than 1% by weight, in particular of not more than 0.50% by weight, for example not more than 0.45% by weight.

Preferably, this precipitated silica has a ratio (R) between 0.4 and 3.5, in particular between 0.4 and 2.5. This ratio (R) may also be between 0.5 and 3.5, especially between 0.5 and 2.5, in particular between 0.5 and 2, for example between 0.7 and 2, or even between 0.7 and 1.8, or between 0.7 and 1.6.

The precipitated silica according to this third variant generally has a Sears number per 1 g of dry silica of at least 2.

The precipitated silicas according to the invention (i.e. in accordance with one of the above three variants of the invention) may simultaneously have an object size distribution width Ld ((d84−d16)/d50), measured by XDC particle size analysis after ultrasound deagglomeration, of at least 0.70, a pore distribution width ldp of less than 0.49 and a Sears number per 1 g of dry silica of less than 8, in particular less than 7.5, for example less than 7.

The silicas according to the invention may especially have a BET specific surface area of between 120 and 190 m$^2$/g, for example between 130 and 170 m$^2$/g.

The precipitated silicas according to the invention may especially have a CTAB specific surface area of between 130 and 200 m$^2$/g, for example between 140 and 190 m$^2$/g.

The precipitated silicas according to the invention may especially have a content (C) of polycarboxylic acid+corresponding carboxylate, expressed as total carbon, of at least 0.24% by weight, in particular of at least 0.30% by weight, for example of at least 0.35% by weight, or even of at least 0.45% by weight.

They generally have a content (C) of polycarboxylic acid+carboxylate of not more than 10.00% by weight, in particular of not more than 5.00% by weight.

The precipitated silicas according to the invention may especially have an object size distribution width Ld ((d84−d16)/d50), measured by XDC particle size analysis after ultrasound deagglomeration, of at least 0.75, in particular of at least 0.80, especially of at least 0.90, for example of at least 1.00.

One of the characteristics of the precipitated silicas according to the invention lies in the distribution of their pore volume and in particular in the distribution of the pore volume which is generated by the pores having diameters of less than or equal to 400 Å. The latter volume corresponds to the useful pore volume of the fillers employed in the reinforcement of elastomers.

Thus, the precipitated silicas according to the invention may especially have a pore distribution such that the pore volume generated by the pores with a diameter of between 175 and 275 Å (V2) represents at least 55%, especially between 55% and 75%, for example between 55% and 70%, of the pore volume generated by the pores with diameters of less than or equal to 400 Å (V1).

Preferably, the precipitated silicas according to the invention have an object size distribution width L'd ((d84−d16)/d50) of less than 500 nm, measured by XDC particle size analysis after ultrasound deagglomeration, of at least 0.65, especially of at least 0.75, in particular of at least 0.85, for example of at least 1.00.

The presence of the polycarboxylic acids and/or of the carboxylates corresponding to the polycarboxylic acids at the surface of the silicas according to the invention can be illustrated by the presence of shoulders characteristic of the C—O and C=O bonds, visible on the infrared spectra, obtained in particular by surface (transmission) infrared or diamond-ATR infrared (in particular between 1540 and 1590 cm$^{-1}$ and between 1380 and 1420 cm$^{-1}$ for C—O, and between 1700 and 1750 cm$^{-1}$ for C=O).

In general, the precipitated silicas according to the invention have at their surface molecules of the precipitated polycarboxylic acid(s), in particular of the polycarboxylic acids of the abovementioned mixtures, and/or of the carboxylate(s) corresponding to the abovementioned polycarboxylic acid(s), in particular corresponding to the polycarboxylic acids of the abovementioned mixtures.

For example, they may have at their surface:
- molecules of adipic acid in acid form and/or in carboxylate form, and
- molecules of glutaric acid in acid form and/or in carboxylate form, and
- molecules of succinic acid in acid form and/or in carboxylate form.

For example, they may have at their surface:
- molecules of methylglutaric acid in acid form and/or in carboxylate form, and
- molecules of ethylsuccinic acid in acid form and/or in carboxylate form, and
- molecules of adipic acid in acid form and/or in carboxylate form.

Preferably, the silicas according to the invention have a dispersive component of the surface energy $\gamma_s^d$ of less than 52 mJ/m$^2$, especially less than 50 mJ/m$^2$, in particular not more than 45 mJ/m$^2$, for example less than 40 mJ/m$^2$, or even less than 35 mJ/m$^2$.

In addition, the precipitated silicas according to the invention may have a specific aluminum coordinancy distribution, determined by solid aluminum NMR. In general, not more than 85% by number, especially not more than 80% by number, in particular between 70% and 85% by number, for example between 70% and 80% by number, of the aluminum atoms of the silicas according to the invention may have tetrahedral coordinancy, i.e. may be in a tetrahedral site. In particular, between 15% and 30% by number, for example between 20% and 30% by number, of the aluminum atoms of the silicas according to the invention may have a pentahedral or octahedral coordinancy, i.e. may be in a pentahedral or octahedral site.

The precipitated silicas according to the invention may have a water uptake of greater than 6.0%, in particular greater than 7.0%, especially greater than 7.5%, for example greater than 8.0%, or even greater than 8.5%.

In general, the silicas according to the invention have a high ability to disperse (in particular in elastomers) and to deagglomerate.

The precipitated silicas according to the invention may have a median diameter $Ø_{50M}$, after ultrasound deagglomeration, of not more than 5.0 μm, preferably not more than 4.5 μm, for example between 4.5 and 1.0 μm, especially between 4.5 and 2.5 μm.

Their ultrasound deagglomeration factor $F_{DM}$ may be greater than 5.5 ml, in particular greater than 7.5 ml, for example greater than 12.0 ml.

The precipitated silicas according to the invention generally have a pH of between 3.5 and 7.5.

The precipitated silicas according to the invention may be in any physical state, i.e. they may be in the form of substantially spherical beads (micropearls), a powder or granules.

They may also be in the form of a powder with a mean size of at least 3 μm, in particular at least 10 μm, preferably at least 15 μm.

They may also be in the form of substantially spherical beads with a mean size of at least 80 μm, preferably at least 150 μm, in particular between 150 and 300 μm; this mean size is determined according to standard NF X 11507 (December 1970) by dry screening and determination of the diameter corresponding to a cumulative oversize of 50%.

They may preferably be in the form of granules (generally of substantially parallelepipedal shape) with a size of at least 1 mm, for example between 1 and 10 mm, especially along the axis of their largest dimension (length).

The silicas according to the invention are preferably obtained via the process described previously.

Advantageously, the precipitated silicas according to the present invention or (that may be) obtained by the process according to the invention described previously confer, on the polymeric (elastomeric) compositions into which they are introduced, a highly satisfactory compromise of properties, in particular a reduction in their viscosity and preferably an improvement in their dynamic properties, while retaining their mechanical properties. Thus, they advantageously allow an improvement in the processing/reinforcement/hysteresis properties compromise. Preferably, they have a good ability to disperse and to deagglomerate in polymeric (elastomeric) compositions.

The precipitated silicas according to the invention or (that may be) obtained by the process described previously according to the invention may be used in numerous applications.

They may be employed, for example, as catalyst support, as absorbent for active materials (in particular support for liquids, especially used in food, such as vitamins (vitamin E) or choline chloride), in polymer, especially elastomer, or silicone compositions, as viscosity-increasing, texturizing or anticaking agent, as battery separator component, or as additive for toothpaste, concrete or paper.

However, they find a particularly advantageous application in the reinforcement of natural or synthetic polymers.

The polymer compositions in which they may be employed, in particular as reinforcing filler, are generally based on one or more polymers or copolymers (especially bipolymers or terpolymers), in particular on one or more elastomers, preferably having at least one glass transition temperature of between −150° C. and +300° C., for example between −150° C. and +20° C.

Mention may in particular be made, as possible polymers, of diene polymers, in particular diene elastomers.

For example, use may be made of polymers or copolymers (in particular bipolymers or terpolymers) deriving from aliphatic or aromatic monomers, comprising at least one unsaturation (such as, in particular, ethylene, propylene, butadiene, isoprene, styrene, acrylonitrile, isobutylene or vinyl acetate), polybutyl acrylate, or mixtures thereof; mention may also be made of silicone elastomers, functionalized elastomers, for example functionalized with chemical groups positioned throughout the macromolecular chain and/or at one or more of its ends (for example with functions capable of reacting with the surface of the silica), and halogenated polymers. Mention may be made of polyamides and fluorinated polymers (such as polyvinylidene fluoride).

Mention may also be made of thermoplastic polymers such as polyethylene.

The polymer (copolymer) may be a bulk polymer (copolymer), a polymer (copolymer) latex or else a solution of polymer (copolymer) in water or in any other suitable dispersing liquid.

Mention may be made, as diene elastomers, for example, of polybutadienes (BRs), polyisoprenes (IRs), butadiene copolymers, isoprene copolymers, or mixtures thereof, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), and also the associated functionalized polymers (for example bearing polar groups included in the chain, pendent or at the chain end, which can interact with the silica).

Mention may also be made of natural rubber (NR) and epoxidized natural rubber (ENR).

The polymer compositions may be vulcanized with sulfur (vulcanizates are then obtained) or crosslinked, in particular with peroxides or other crosslinking systems (for example diamines or phenolic resins).

In general, the polymer compositions also comprise at least one (silica/polymer) coupling agent and/or at least one covering agent; they may also comprise, inter alia, an antioxidant.

Nonlimiting examples of coupling agents that may especially be used include "symmetrical" or "unsymmetrical" silane polysulfides; mention may more particularly be made of bis(($C_1$-$C_4$)alkoxyl($C_1$-$C_4$)alkylsilyl($C_1$-$C_4$)alkyl) polysulfides (in particular disulfides, trisulfides or tetrasulfides), for instance bis(3-(trimethoxysilyl)propyl) polysulfides or bis(3-(triethoxysilyl)propyl) polysulfides, such as triethoxysilylpropyl tetrasulfide. Mention may also be made of monoethoxydimethylsilylpropyl tetrasulfide. Mention may also be made of silanes bearing masked or free thiol functions, or bearing amine functions.

The coupling agent may be grafted beforehand onto the polymer.

It may also be used in the free state (i.e. not grafted beforehand) or grafted to the surface of the silica. This is likewise the case for the optional covering agent.

The coupling agent may optionally be combined with a suitable "coupling activator", i.e. a compound which, when mixed with this coupling agent, increases the efficacy of the latter.

The weight proportion of silica in the polymer composition may vary within a fairly wide range. It usually represents from 0.1 to 3.0 times by weight, in particular 0.1 to 2.0 times by weight, especially 0.2 to 1.5 times by weight, for example 0.2 to 1.2 times by weight, or even 0.3 to 0.8 times by weight of the amount of the polymer(s).

The silica obtained or that may be obtained via the process according to the invention may advantageously constitute all of the reinforcing mineral filler and even all of the reinforcing filler of the polymer composition.

However, this silica obtained or that may be obtained via the process according to the invention may optionally be combined with at least one other reinforcing filler, such as, in particular, a commercial highly dispersible silica, for instance Z1165MP or Z1115MP, a treated precipitated silica (for example, a precipitated silica "doped" with a cation such as aluminum, or treated with a coupling agent such as a silane); another reinforcing mineral filler, for instance alumina, or even a reinforcing organic filler, especially carbon black (optionally covered with a mineral layer, for example of silica). The silica according to the invention then preferably constitutes at least 50% by weight, or even at least 80% by weight, of all of the reinforcing filler.

Mention may be made, as nonlimiting examples of finished articles comprising at least one of (in particular based on) said polymer compositions described previously (especially based on the abovementioned vulcanizates), of footwear soles (preferably in the presence of a (silica/polymer) coupling agent, for example triethoxysilylpropyl tetrasulfide), floor coverings, gas barriers, flame-retardant materials and also engineering components, such as rollers for cableways, seals for domestic electrical appliances, seals for liquid or gas pipes, braking system seals, pipes (flexible), sheathings (in particular cable sheathings), cables, engine supports, battery separators, conveyor belts, transmission belts or, preferably, tires, in particular tire treads (especially for light vehicles or for heavy-goods vehicles (for example trucks)).

The examples that follow illustrate the invention without, however, limiting the scope thereof.

EXAMPLES

Example 1

15 226 liters of industrial water and 465 kg of sodium silicate ($SiO_2/NaO_2$ weight ratio equal to 3.4) with a density at 20° C. equal to 1.230±0.006 are placed in a reactor.

The concentration of silicate, expressed as $SiO_2$, in the initial feedstock is then 5.5 g/l.

The mixture is then brought to 70° C. with continued stirring. Sulfuric acid (mass concentration equal to 7.7%) is then introduced into the mixture, over 7 minutes, until the pH of the reaction medium reaches a value of 8.7. Once the acidification is complete, sodium silicate of the type described above is introduced into the reaction medium at a flow rate of 8.5 m³/h, simultaneously with sulfuric acid (mass concentration equal to 7.7%) at a flow rate regulated so as to maintain the pH of the reaction medium at a value of 8.7. After 50 minutes of simultaneous addition, the introduction of the sodium silicate is stopped and the addition of sulfuric acid is continued so as to bring the pH of the reaction medium to a value equal to 5.2.

A reaction slurry of precipitated silica is thus obtained after the reaction, which is filtered and washed using a filter press so as to recover a silica cake with a solids content of 22% by weight.

Example 2

Part of the filter cake obtained in Example 1 (7500 g) is then subjected to a liquefaction operation.

During the liquefaction operation, a solution of an MGA mixture at 34% by mass (mixture of polycarboxylic acids: 94.8% by weight of methylglutaric acid, 4.9% by weight of ethylsuccinic anhydride, 0.2% by weight of adipic acid, 0.1% others).

The cake obtained in the filtration step is subjected to a liquefaction operation in a continuous vigorously stirred reactor with simultaneous addition to the cake of 44.8 grams of a sodium aluminate solution ($Al/SiO_2$ weight ratio of 0.3%) and 51 grams of the MGA solution (MGA mixture/$SiO_2$ weight ratio of 1.0%).

This disintegrated cake (with a solids content of 23% by weight) is subsequently dried using a two-fluid nozzle atomizer by spraying the disintegrated cake through a 2.54 mm SU5 nozzle (Spraying System) with a pressure of 1 bar under the following mean conditions of flow rate and of temperatures:

Mean inlet temperature: 250° C.
Mean outlet temperature: 135° C.
Mean flow rate: 16.5 l/h.

The silica obtained, which is in powder form, is then formed into granules using a compactor (Alexanderwerk WP 120*40). A precipitated silica in the form of granules is then obtained.

The characteristics of the silica S1 obtained (in the form of granules) are then as follows:

| | |
|---|---|
| BET ($m^2/g$) | 148 |
| Content of polycarboxylic acid + carboxylate (C) (%) | 0.45 |
| Aluminum (Al) content (%) | 0.47 |
| Ratio (R) | 0.7 |
| CTAB ($m^2/g$) | 156 |
| $\gamma_s^d$ ($mJ/m^2$) | 48.5 |
| V2/V1 (%) | 66.0 |
| Pore distribution width ldp | 0.43 |
| Water uptake (%) | 7.3 |
| $\varnothing_{50M}$ (μm) after ultrasound deagglomeration | 2.7 |
| $F_{DM}$ after ultrasound deagglomeration | 19.9 |
| pH | 5.65 |

Example 3

Part of the filter cake obtained in Example 1 (7500 g) is then subjected to a liquefaction operation.

During the liquefaction operation, a solution of an MGA mixture at 34% by mass (mixture of polycarboxylic acids: 94.8% by weight of methylglutaric acid, 4.9% by weight of ethylsuccinic anhydride, 0.2% by weight of adipic acid, 0.1% others) is used.

The cake obtained in the filtration step is subjected to a liquefaction operation in a continuous vigorously stirred reactor with addition to the cake of 57.5 grams of the MGA solution (MGA mixture/$SiO_2$ weight ratio of 1%).

This disintegrated cake (with a solids content of 23% by weight) is subsequently dried using a two-fluid nozzle atomizer by spraying the disintegrated cake through a 2.54 mm SU5 nozzle (Spraying System) with a pressure of 1 bar under the following mean conditions of flow rate and of temperatures:

Mean inlet temperature: 250° C.
Mean outlet temperature: 135° C.
Mean flow rate: 16.5 l/h.

The silica obtained, which is in powder form, is then formed into granules using a compactor (Alexanderwerk WP 120*40). A precipitated silica in the form of granules is then obtained.

The characteristics of the silica S2 obtained (in the form of granules) are then as follows:

| | |
|---|---|
| BET (m²/g) | 151 |
| Content of polycarboxylic acid + carboxylate (C) (%) | 0.36 |
| CTAB (m²/g) | 162 |
| $\gamma_s^d$ (mJ/m²) | 40.3 |
| V2/V1 (%) | 66.0 |
| Pore distribution width ldp | 0.44 |
| Water uptake (%) | 7.4 |
| $\emptyset_{50M}$ (µm) after ultrasound deagglomeration | 4.4 |
| $F_{DM}$ after ultrasound deagglomeration | 19.1 |
| pH | 3.86 |

Example 4 (Comparative)

Part of the filter cake obtained in Example 1 (7500 g) is then subjected to a liquefaction operation.

The cake obtained in the filtration step is subjected to a liquefaction operation in a continuous vigorously stirred reactor with simultaneous addition to the cake of 43.8 grams of a sodium aluminate solution (Al/SiO₂ weight ratio of 0.3%) and 48.5 grams of a sulfuric acid solution at 7.7% by mass.

This disintegrated cake (with a solids content of 23% by weight) is subsequently dried using a two-fluid nozzle atomizer by spraying the disintegrated cake through a 2.54 mm SU5 nozzle (Spraying System) with a pressure of 1 bar under the following mean conditions of flow rate and of temperatures:

Mean inlet temperature: 250° C.
Mean outlet temperature: 135° C.
Mean flow rate: 16.5 l/h.

The silica obtained, which is in powder form, is then formed into granules using a compactor (Alexanderwerk WP 120*40). A precipitated silica in the form of granules is then obtained.

The characteristics of the silica C1 obtained (in the form of granules) are then as follows:

| | |
|---|---|
| BET (m²/g) | 157 |
| Content of polycarboxylic acid + carboxylate (C) (%) | — |
| Aluminum (Al) content (%) | 0.45 |
| Ratio (R) | 0.0 |
| CTAB (m²/g) | 152 |
| $\gamma_s^d$ (mJ/m²) | 62.9 |
| V2/V1 (%) | 62.0 |
| Pore distribution width ldp | 0.47 |
| Water uptake (%) | 7.8 |
| $\emptyset_{50M}$ (µm) after ultrasound deagglomeration | 1.9 |
| $F_{DM}$ after ultrasound deagglomeration | 19.5 |
| pH | 6.92 |

Example 5

A second filter cake with a solids content of 23% by weight is prepared according to the procedure of Example 1.

Examples 6 and 7

A first part of the silica cake obtained in Example 5 (8000 g) is then subjected to a liquefaction step.

During the liquefaction operation, a solution of an MGA mixture at 34% by mass (mixture of polycarboxylic acids: 94.8% by weight of methylglutaric acid, 4.9% by weight of ethylsuccinic anhydride, 0.2% by weight of adipic acid, 0.1% others) is used.

The cake obtained in the filtration step of Example 5 is thus subjected to a liquefaction operation in a continuous vigorously stirred reactor with simultaneous addition to the cake of 51.3 grams of the MGA solution (MGA mixture/SiO₂ weight ratio of 1.0%) and 144 g of water.

This disintegrated cake (with a solids content of 23% by weight) is subsequently dried using a two-fluid nozzle atomizer by spraying the disintegrated cake through a 2.54 mm SU5 nozzle (Spraying System) with a pressure of 1 bar under the following mean conditions of flow rate and of temperatures:

Mean inlet temperature: 250° C.
Mean outlet temperature: 140° C.
Mean flow rate: 9.7 l/h.

The powder thus generated is separated by screening at 100 microns on an S079 screen (Chauvin—screening area of 0.3 m²).

The characteristics of the silica S3 obtained (in the form of substantially spherical beads) are indicated in the table below.

A second part of the silica cake obtained in Example 5 (8000 g) is then subjected to a liquefaction step using a solution of an MGA mixture at 34% by mass (mixture of polycarboxylic acids: 94.8% by weight of methylglutaric acid, 4.9% by weight of ethylsuccinic anhydride, 0.2% by weight of adipic acid, 0.1% others).

The cake obtained in the filtration step of Example 5 is thus subjected to a liquefaction operation in a continuous vigorously stirred reactor with simultaneous addition to the cake of 51.3 grams of the MGA solution (MGA mixture/SiO₂ weight ratio of 1.0%), 39.7 g of a sodium aluminate solution (Al/SiO₂ weight ratio of 0.3%) and 144 g of water.

This disintegrated cake (having a solids content of 23% by weight) is subsequently dried using a two-fluid nozzle atomizer as described above for the first part of the cake, under the following mean conditions of flow rate and of temperatures:

Mean inlet temperature: 250° C.
Mean outlet temperature: 140° C.
Mean flow rate: 10.8 l/h.

The powder thus generated is separated by screening at 100 microns on an S079 screen (Chauvin—screening area of 0.3 m²).

The characteristics of the silica S4 obtained (in the form of substantially spherical beads) are indicated in the table below.

| Characteristics | S3 | S4 |
|---|---|---|
| BET (m²/g) | 164 | 160 |
| Content of polycarboxylic acid + carboxylate (C) (%) | 0.35 | 0.34 |
| Aluminum (Al) content (%) | — | 0.41 |
| CTAB (m²/g) | 162 | 157 |
| $\gamma_s^d$ (mJ/m²) | 40.6 | 47.6 |
| Width Ld (XDC) | 1.15 | 0.98 |
| V2/V1 (%) | 59.0 | 62.0 |
| Pore distribution width ldp | 0.60 | 0.57 |
| Width L'd (XDC) | 1.06 | 0.92 |
| Water uptake (%) | 7.2 | 7.3 |
| $\emptyset_{50M}$ (µm) after ultrasound deagglomeration | 2.6 | 1.6 |
| $F_{DM}$ after ultrasound deagglomeration | 19.7 | 20.0 |
| pH | 4.5 | 5.6 |

Example 8 (Comparative)

Part of the silica cake (8000 g) obtained in Example 5 is then subjected to a liquefaction step.

The cake obtained in the filtration step is subjected to a liquefaction operation in a continuous vigorously stirred reactor with simultaneous addition to the cake of 39.8 grams of a sodium aluminate solution (Al/SiO$_2$ weight ratio of 0.3%), 51.8 grams of a sulfuric acid solution at 7.7% by mass and 144 g of water.

This disintegrated cake (with a solids content of 23% by weight) is subsequently dried using a two-fluid nozzle atomizer by spraying the disintegrated cake through a 2.54 mm SU5 nozzle (Spraying System) with a pressure of 1 bar under the following mean conditions of flow rate and of temperatures:

Mean inlet temperature: 250° C.

Mean outlet temperature: 140° C.

Mean flow rate: 9.6 l/h.

The powder thus generated is separated by screening at 100 microns on an S079 screen (Chauvin—screening area of 0.3 m$^2$).

The characteristics of the silica C2 obtained (in the form of substantially spherical beads) are then the following:

| | |
|---|---|
| BET (m$^2$/g) | 169 |
| Content of polycarboxylic acid + carboxylate (C) (%) | — |
| Aluminum (Al) content (%) | 0.40 |
| CTAB (m$^2$/g) | 159 |
| $\gamma_s^d$ (mJ/m$^2$) | 66.4 |
| Width Ld (XDC) | 1.02 |
| V2/V1 (%) | 62.0 |
| Pore distribution width ldp | 0.60 |
| Width L'd (XDC) | 0.97 |
| Water uptake (%) | 7.6 |
| $\varnothing_{50M}$ (μm) after ultrasound deagglomeration | 1.4 |
| $F_{DM}$ after ultrasound deagglomeration | 20.1 |
| pH | 7.3 |

Example 9

The elastomeric compositions, the make up of which, expressed as parts by weight per 100 parts of elastomers (phr), is shown in Table I below, are prepared in an internal mixer of Brabender type (380 ml):

TABLE I

| | Composition | | |
|---|---|---|---|
| | Control 1 | Composition 1 | Composition 2 |
| SBR (1) | 103 | 103 | 103 |
| BR (1) | 25 | 25 | 25 |
| Silica C2 (2) | 80 | | |
| Silica S3 (3) | | 80 | |
| Silica S4 (4) | | | 80 |
| Coupling agent (5) | 6.4 | 6.4 | 6.4 |
| Plasticizer (6) | 5 | 5 | 5 |
| Carbon black (N330) | 3 | 3 | 3 |
| ZnO | 2.5 | 2.5 | 2.5 |
| Stearic acid | 2 | 2 | 2 |

TABLE I-continued

| | Composition | | |
|---|---|---|---|
| | Control 1 | Composition 1 | Composition 2 |
| Antioxidant (7) | 1.9 | 1.9 | 1.9 |
| DPG (8) | 1.5 | 1.5 | 1.5 |
| CBS (9) | 2 | 2 | 2 |
| Sulfur | 1.1 | 1.1 | 1.1 |

(1) Solution SBR (Buna V5L4526-2 from the company Lanxess) with 44.5 ± 4% of vinyl units; 26 ± 2% of styrene units; Tg in the region of −30° C.; 100 phr of SBR extended with 37.5 ± 2.8% by weight of oil/BR (Buna CB 25 from the company Lanxess)
(2) Silica C2 (liquefaction with simultaneous addition of sodium aluminate and sulfuric acid (Example 8-comparative))
(3) Silica S3 according to the present invention (liquefaction with addition of a mixture of MGA acids (Example 6 above))
(4) Silica S4 according to the present invention (liquefaction with simultaneous addition of sodium aluminate and of a mixture of MGA acids (Example 7 above))
(5) TESPT (Luvomaxx TESPT from the company Lehvoss France sarl)
(6) Plasticizing oil of TDAE type (Vivatec 500 from the company Hansen & Rosenthal KG)
(7) N-(1,3-dimethylbutyl)-N-phenyl-para-phenylenediamine (Santoflex 6-PPD from the company Flexsys)
(8) Diphenylguanidine (Rhenogran DPG-80 from RheinChemie)
(9) N-cyclohexyl-2-benzothiazolylsulfenamide (Rhenogran CBS-80 from the company RheinChemie)

Process for preparing the elastomeric compositions:

The process for preparing the rubber compositions is performed in two successive preparation phases. A first phase consists of a phase of high-temperature thermomechanical working. It is followed by a second phase of mechanical working at temperatures below 110° C. This phase allows the introduction of the vulcanization system.

The first phase is carried out using a mixing device, of internal mixer type, of Brabender brand (capacity of 380 ml). The filling coefficient is 0.6. The initial temperature and speed of the rotors are set on each occasion so as to achieve mixture dropping temperatures of approximately 140-160° C.

Broken down here into two passes, the first phase makes it possible to incorporate, in a first pass, the elastomers and then the reinforcing filler (portionwise introduction) with the coupling agent and the stearic acid. For this pass, the duration is between 4 and 10 minutes.

After cooling the mixture (temperature of less than 100° C.), a second pass makes it possible to incorporate the zinc oxide and the protecting agents/antioxidants (in particular 6-PPD). The duration of this pass is between 2 and 5 minutes.

After cooling the mixture (temperature of less than 100° C.), the second phase allows the introduction of the vulcanization system (sulfur and accelerators, such as CBS). It is performed on an open mill, preheated to 50° C. The duration of this phase is between 2 and 6 minutes.

Each final mixture is subsequently calendered in the form of plates with a thickness of 2-3 mm.

An evaluation of the rheological properties of these "crude" mixtures obtained makes it possible to optimize the vulcanization time and the vulcanization temperature.

The mechanical and dynamic properties of the mixtures vulcanized at the curing optimum (T98) are then measured.

Rheological Properties

Viscosity of the crude mixtures:

The Mooney consistency is measured on the compositions in the crude state at 100° C. using an MV 2000 rheometer and also the determination of the Mooney stress-relaxation rate according to standard NF ISO 289.

The value of the torque, read at the end of 4 minutes after preheating for one minute (Mooney Large (1+4)—at 100° C.), is shown in Table II. The test is performed after preparing the crude mixtures and then after aging for 3 weeks at a temperature of 23±3° C.

TABLE II

| References | | Control 1 | Composition 1 | Composition 2 |
|---|---|---|---|---|
| ML (1 + 4) - 100° C. | Initial | 75 | 68 | 68 |
| Mooney relaxation | Initial | 0.327 | 0.338 | 0.353 |
| ML (1 + 4) - 100° C. | After 21 days (23 ± 3° C.) | 96 | 77 | 78 |
| Mooney relaxation | After 21 days (23 ± 3° C.) | 0.264 | 0.297 | 0.304 |

It is found that the silicas S3 and S4 of the present invention (Compositions 1 and 2) allow a substantial reduction in the initial crude viscosity, relative to the value of the mixture with the reference (Control 1).

It is also found that the silicas S3 and S4 of the present invention (Compositions 1 and 2) make it possible to retain the advantage in crude viscosity, relative to the value of the mixture with the reference (Control 1), after 21 days of storage.

This type of behavior over time is of great use to a person skilled in the art in the case of using rubber mixtures containing silica.

Rheometry of the compositions:

The measurements are performed on the compositions in crude form. The results relating to the rheology test, which is performed at 160° C. using a Monsanto ODR rheometer according to the standard NF ISO 3417, are given in Table III.

According to this test, the test composition is placed in the test chamber regulated at the temperature of 160° C. for 30 minutes, and the resistive torque opposed by the composition to a low-amplitude (3°) oscillation of a biconical rotor included in the test chamber is measured, the composition completely filling the chamber under consideration.

The following are determined from the curve of variation in the torque as a function of time:

the minimum torque (Tmin), which reflects the viscosity of the composition at the temperature under consideration;

the maximum torque (Tmax);

the delta torque (ΔT=Tmax−Tmin), which reflects the degree of crosslinking brought about by the action of the crosslinking system and, if the need arises, of the coupling agents;

the time T98 necessary to obtain a vulcanization state corresponding to 98% of complete vulcanization (this time is taken as the vulcanization optimum);

and the scorch time TS2, corresponding to the time necessary in order to have a rise of 2 points above the minimum torque at the temperature under consideration (160° C.) and which reflects the time during which it is possible to implement the raw mixtures at this temperature without having initiation of vulcanization (the mixture cures at and above TS2).

The results obtained are shown in Table III.

TABLE III

| | Compositions | | |
|---|---|---|---|
| | Control 1 | Composition 1 | Composition 2 |
| Tmin (dN · m) | 18.7 | 16.5 | 16.5 |
| Tmax (dN · m) | 58.9 | 59.6 | 63.8 |
| Delta torque (dN · m) | 40.2 | 43.1 | 47.3 |
| TS2 (min) | 4.2 | 5.4 | 5.1 |
| T98 (min) | 25.3 | 26.6 | 26.3 |

The use of silicas S3 and S4 of the present invention (Compositions 1 and 2) makes it possible to reduce the minimum viscosity (sign of an improvement in the crude viscosity) relative to the control mixture (Control 1) without impairing the vulcanization behavior.

It is also found that the use of silicas S3 and S4 of the present invention (Compositions 1 and 2) makes it possible to improve the scorch time TS2 relative to the control mixture (Control 1) without impairing the time T98. The stability of the mixtures is thus improved.

Mechanical properties of the vulcanizates:

The measurements are performed on the optimally vulcanized compositions (T98) for a temperature of 160° C.

Uniaxial tensile tests are performed in accordance with the instructions of standard NF ISO 37 with test specimens of H2 type at a rate of 500 mm/min on an Instron 5564 machine. The x % moduli, corresponding to the stress measured at x % of tensile strain, and the ultimate strength are expressed in MPa; the elongation at break is expressed in %. It is possible to determine a reinforcing index (RI) which is equal to the ratio of the modulus at 300% strain to the modulus at 100% strain.

The Shore A hardness measurement of the vulcanizates is performed according to the instructions of standard ASTM D 2240. The given value is measured at 15 seconds.

The properties measured are collated in Table IV.

TABLE IV

| | Compositions | | |
|---|---|---|---|
| | Control 1 | Composition 1 | Composition 2 |
| 10% Modulus (MPa) | 0.5 | 0.5 | 0.5 |
| 100% Modulus (MPa) | 1.8 | 1.6 | 1.7 |
| 300% Modulus (MPa) | 8.3 | 6.8 | 7.9 |
| Ultimate strength (MPa) | 20.7 | 19.9 | 20.9 |
| Elongation at break (%) | 538 | 588 | 550 |
| RI | 4.6 | 4.3 | 4.6 |
| Shore A hardness - 15 s (pts) | 59 | 55 | 57 |

The use of silicas S3 and S4 of the present invention (Compositions 1 and 2) makes it possible to obtain a satisfactory level of reinforcement, relative to the control mixture (Control 1) and in particular to conserve a high level of the 300% strain modulus without penalizing the reinforcement index and the ultimate properties (breaking strength and elongation at break).

Dynamic Properties of the Vulcanizates:

The dynamic properties are measured on a viscosity analyzer (Metravib VA3000) according to standard ASTM D5992.

The values for the loss factor (tan δ) and the dynamic shear elastic modulus ($G^*_{12\%}$) are recorded on vulcanized samples (parallelepipedal test specimen with a cross section of 8 mm$^2$ and a height of 7 mm). The sample is subjected to a double alternating sinusoidal shear strain at a temperature of 40° C. and at a frequency of 10 Hz. The strain amplitude sweeping processes are performed according to an outward-return cycle, proceeding outward from 0.1% to 50% and then returning from 50% to 0.1%.

The results, presented in Table V, result from the return strain amplitude sweep and relate to the maximum value of the loss factor (tan δ max return, 40° C., 10 Hz) and also the elastic modulus $G^*_{12\%}$.

TABLE V

| | Compositions | | |
|---|---|---|---|
| | Control 1 | Composition 1 | Composition 2 |
| $G^*_{12\%}$, 40° C., 10 Hz (MPa) | 1.4 | 1.4 | 1.4 |
| Tan δmax return, 40° C., 10 Hz | 0.224 | 0.201 | 0.212 |

The use of the silicas S3 and S4 of the present invention (Compositions 1 and 2) makes it possible to achieve improved dynamic properties at 40° C. when compared with those of the control mixture (Control 1), the stiffness/dissipation compromise thus being improved.

Examination of the various Tables II to V shows that the compositions in accordance with the invention (Compositions 1 and 2) make it possible to improve the processing/reinforcement/hysteresis properties at 40° C. compromise, relative to the control composition (Control 1), and in particular to achieve a substantial gain in crude viscosity, which remains stable on storage over time.

The invention claimed is:

1. A precipitated silica, characterized in that it has:
    a BET specific surface area of between 100 and 240 m²/g,
    a CTAB specific surface area of between 100 and 240 m²/g,
    a content (C) of polycarboxylic acid+corresponding carboxylate, expressed as total carbon, of at least 0.15% by weight,
    an object size distribution width Ld ((d84 d16)/d50), measured by XDC particle size analysis after ultrasound deagglomeration, of at least 0.70, and
    a pore distribution width ldp of less than 0.65, and optionally
    an aluminum (Al) content of at least 0.20% by weight;
    wherein the precipitated silica comprises a mixture of polycarboxylic acids, and wherein the mixture of polycarboxylic acids comprises methylglutaric acid, ethylsuccinic acid and adipic acid.

2. The precipitated silica as claimed in claim 1, wherein the precipitated silica has a pore distribution such that the pore volume generated by the pores whose diameter is between 175 and 275 Å represents at least 55% of the pore volume generated by the pores with diameters of less than or equal to 400 Å.

3. The precipitated silica as claimed in claim 1, wherein the precipitated silica has a dispersive component of the surface energy $\gamma_s^d$ of less than 52 mJ/m².

4. A process for preparing the precipitated silica of claim 1, the process comprising:
    precipitating a silicate and an acidifying agent by:
        (i) forming an initial feedstock comprising part of a total amount of alkali metal M silicate engaged in the reaction, the concentration of silicate, expressed as SiO₂, in said initial feedstock being less than 20 g/l,
        (ii) adding acidifying agent to said initial feedstock, until at least 50% of the amount of M₂O present in said initial feedstock is neutralized, to form a reaction medium,
        (iii) simultaneously adding alkali metal M silicate and acidifying agent to the reaction medium, such that the ratio of the amount of silicate added expressed as SiO₂/amount of silicate present in the initial feedstock expressed as SiO₂ is greater than 4 and not more than 100,
        (iv) discontinuing the addition of the silicate while continuing the addition of the acidifying agent to the reaction medium, until a value of the pH of the reaction medium of between 2.5 and 5.3 is obtained, thus providing a silica suspension
    filtering the silica suspension to form a filter cake,
    subjecting the filter cake to a liquefaction operation to form a second filter cake,
    drying the second filter cake,
    wherein the mixture of polycarboxylic acids is added to the filter cake, either during the liquefaction operation, or after the liquefaction operation and before the drying step.

5. The process as claimed in claim 4, wherein, during the liquefaction operation, the mixture of polycarboxylic acids is added to the filter cake.

6. The process as claimed in claim 4, wherein the mixture of polycarboxylic acids is added to the filter cake after the liquefaction operation.

7. The process as claimed in claim 4, wherein the liquefaction operation comprises the addition of at least one aluminum compound.

8. The process as claimed in claim 7, wherein, during the liquefaction operation, the mixture of polycarboxylic acids and at least one aluminum compound are simultaneously added to the filter cake.

9. The process as claimed in claim 7, wherein, during the liquefaction operation, at least one aluminum compound is added to the filter cake prior to the addition of the mixture of polycarboxylic acids.

10. The process as claimed in claim 7, wherein the mixture of polycarboxylic acids is added to the filter cake after the liquefaction operation.

11. A polymer composition comprising a precipitated silica as claimed in claim 1.

12. A method for reinforcing a polymer, the method comprising adding a precipitated silica as claimed in claim 1 to the polymer as a reinforcing filler.

13. A precipitated silica, characterized in that it has:
    a BET specific surface area of between 100 and 240 m²/g,
    a CTAB specific surface area of between 100 and 240 m²/g,
    a content (C) of polycarboxylic acid+corresponding carboxylate, expressed as total carbon, of at least 0.15% by weight,
    a pore distribution width ldp of less than 0.49, and optionally
    an aluminum (Al) content of at least 0.20% by weight;
    wherein the precipitated silica comprises a mixture of polycarboxylic acids, and wherein the mixture of polycarboxylic acids comprises methylglutaric acid, ethylsuccinic acid and adipic acid.

14. An article comprising at least one composition as claimed in claim 11, wherein the article is selected from a footwear sole, a floor covering, a gas barrier, a flame-retardant material, a roller for cableways, a seal for domestic electrical appliances, a seal for liquid or gas pipes, a braking system seal, a pipe, a sheathing, a cable, an engine support, a battery separator, a conveyor belt, a transmission belt and a tire.

15. The article as claimed in claim 14, wherein the article is a tire.

16. A method for reducing the viscosity of a polymer composition, the method comprising adding the precipitated silica as claimed in claim 13 to the polymer composition.

* * * * *

UNITED STATES PATENT AND TRADEMARK OFFICE
CERTIFICATE OF CORRECTION

| | | |
|---|---|---|
| PATENT NO. | : 11,104,583 B2 | Page 1 of 1 |
| APPLICATION NO. | : 15/122088 | |
| DATED | : August 31, 2021 | |
| INVENTOR(S) | : Cédric Boivin et al. | |

It is certified that error appears in the above-identified patent and that said Letters Patent is hereby corrected as shown below:

In the Claims

At Column 29, Claim number 1, Line number 38, "(d84 d16)/d50" should read -- (d84 – d16)/d50 --.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*